(12) United States Patent
Diaz (10) Patent No.: US 6,200,102 B1
(45) Date of Patent: Mar. 13, 2001

(54) METHOD AND APPARATUS FOR AN ELECTROMAGNETIC PROPULSION SYSTEM

(76) Inventor: Rodolfo E. Diaz, 3231 E. Cottonwood La., Phoenix, AZ (US) 85048

( * ) Notice: Subject to any disclaimer, the term of this patent is extended or adjusted under 35 U.S.C. 154(b) by 0 days.

(21) Appl. No.: 09/260,312

(22) Filed: Mar. 2, 1999

Related U.S. Application Data (63) Continuation of application No. 08/443,658, filed on May 18, 1995, now Pat. No. 5,675,306, which is a continuation of application No. 08/853,734, filed on May 9, 1997, now Pat. No. 5,993,164.

(51) Int. Cl.[7] .................................................. H02K 44/00

(52) U.S. Cl. .................................. 417/50; 417/53; 310/11

(58) Field of Search .......................... 417/50, 53; 310/11; 60/220, 221

(56) References Cited

U.S. PATENT DOCUMENTS

| 2,997,013 | * | 8/1961 | Rice ........................................ | 417/50 |
|---|---|---|---|---|
| 3,141,413 | | 7/1964 | Heyman ................................. | 417/50 |
| 3,285,179 | | 11/1966 | Resler, Jr. ............................. | 417/50 |
| 3,540,047 | | 11/1970 | Walser et al. ........................ | 417/50 |
| 3,837,763 | | 9/1974 | Ertaud et al. ......................... | 417/50 |

(List continued on next page.)

FOREIGN PATENT DOCUMENTS 268435   2/1969   (AT) .

OTHER PUBLICATIONS

Mitchell, et al.; "Induction Drive Magnetohydrodynamic Propulsion" Journal of Superconductivity, (1993) vol. 6, No. 4, pp. 227–235.

Meng, et al.; "Superconducting Electromagnetic Thrusters—enabled by Recent Technical Advances, Particularly Superconducting Magnets—New Frontier for Exploration Defined" SEA Technology (Nov. 1992), pp. 29–29.

"Levitation–Melting Method Intrigues Investment Casters" Advanced Materials and Processes (Mar. 1991), pp. 42–45.

Bessho, et al.; "Flow Rate Characteristics of Flux–Concentration Type Electromagnetic Pump" Simulation and Design of Application Electromagnetic Systems, (1994), T. Honma (Editor), pp. 511–514.

Imaichi, et al. "The Suprconducting MHD–Propelled Ship YAMATO–1" Simulation and Design of Application Electromagnetic Systems (1994) T. Honma (Editor), pp. 651–654.

Sakuraya, et al.; "Levitation Melting by Duplex Configurations of Inverters with Different Frequency" Simulation and Design of Application Electromagnetic Systems (1994) T. Honma (Editor), pp. 483–487.

Iwata, et al., "Estimation of the Critical Mass in Levitation Melting Process" Simulation and Design of Application Electromagnetic Systems (1994) T. Honma (Editor), pp. 499–507.

Primary Examiner—Charles G. Freay
Assistant Examiner—Robert Z. Evora
(74) Attorney, Agent, or Firm—David G. Beck; McCutchen, Doyle, Brown & Enerson, LLP (57) ABSTRACT

A method and apparatus to amplify the magnetic field in an electromagnetic circuit is provided. Amplification factors of several orders of magnitude may be obtained. The system is applicable to a number of different systems, including melt levitation and electromagnetic pumping and propulsion. One embodiment of the invention uses a non-conducting permeable core wound around a dielectric core. An alternating voltage source is connected to a solenoid which is wound around a section of the permeable core. The permeable core has a gap within which a flux concentrating cold crucible is provided. Melt levitation processing takes place within the cold crucible.

12 Claims, 7 Drawing Sheets

U.S. PATENT DOCUMENTS

| | | | |
|---|---|---|---|
| 3,973,878 | | 8/1976 | Le Frére ................................ 417/50 |
| 4,392,786 | | 7/1983 | Merenkov et al. ..................... 417/50 |
| 4,694,888 | | 9/1987 | Yoshida et al. ....................... 164/467 |
| 4,818,185 | * | 4/1989 | Alexeff .................................. 417/50 |
| 5,249,990 | * | 10/1993 | Laukien .................................. 440/6 |
| 5,333,444 | * | 8/1994 | Meng ..................................... 60/221 |
| 5,435,761 | * | 7/1995 | Shimamune et al. ..................... 440/6 |
| 5,594,218 | * | 1/1997 | Diaz et al. ........................... 181/295 |
| 5,662,982 | * | 9/1997 | Diaz ..................................... 428/116 |
| 5,668,420 | * | 9/1997 | Lin et al. .............................. 310/11 |
| 5,685,698 | * | 11/1997 | Smoll ..................................... 417/50 |

\* cited by examiner

METHOD AND APPARATUS FOR AN ELECTROMAGNETIC PROPULSION SYSTEM

CROSS-REFERENCE TO RELATED APPLICATIONS

This application is a continuation of Ser. No. 08/443,658, filed on May 18, 1995, now U.S. Pat. No. 5,675,306, which is a continuation of Ser. No. 08/853,734 filed on May 9, 1997, now U.S. Pat. No. 5,993,164.

The present invention relates generally to electromagnetic amplification systems and, more particularly, to a method and apparatus for the propulsion of objects using electromagnetic fields.

BACKGROUND OF THE INVENTION

The movement of objects through the influence of electromagnetic fields is a widespread engineering practice with many advantages over mechanical alternatives. One application of this practice is the electromagnetic levitation of metals for crucibleless processing. In this application a body of metal is suspended in space by the induced eddy current repulsion between the metal and a suitably shaped alternating magnetic field. Melting is induced by making the eddy currents intense enough or through the application of an additional RF field. The molten metal is then processed and separated while it is suspended in space, thus never coming in contact with a crucible. Very pure, uncontaminated metal products are obtained this way.

Figure 1:
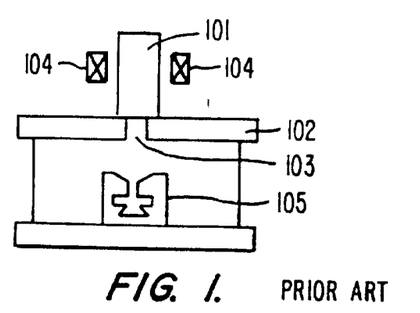
FIG. 1 is a schematic representation of a prior art electromagnetic levitation melt system.

A specific electromagnetic levitation melt system designed to combine the melting, melt treatment, and pouring procedures into a single operation was developed at the University of Alabama and described in *Levitation-Melting Method Intrigues Investment Casters* (March 1991) Advanced Materials and Processes, 42–45. As shown schematically in FIG. 1 a metal 101, which is to be processed, initially rests on top of a base plate 102 which has a hole 103 in its center, the hole's diameter being slightly smaller than that of the metal billet. When power is supplied to a set of induction coils 104, a current is induced in metal 101 causing it to begin to heat up and gradually melt, melting from top to bottom. The electromagnetic force field created by the interaction of the induced current and its associated magnetic field has a rotational component which stirs the melt. The irrotational component of the field pushes against the outside surface of the melt. When the center of the bottom of the billet melts, the liquid metal drops through hole 103 into a mold 105.

A second type of related application is electromagnetic pumping, where a conducting fluid is propelled along a channel through the interaction of induced currents and static or alternating magnetic fields. An overview of such propulsion systems is given by D. L. Mitchell et al. in an article entitled *Induction-Drive Magnetohydrodynamic (MHD) Propulsion* in Journal of Superconductivity, 6 (4) (1993) 227–235. The authors describe the early research in applying MHD propulsion systems to seagoing vessels during the 1960's through the current research using high field superconducting magnet technology. A cited example of recent research in this area is the Yamato I, a 280-ton test vessel utilizing two MHD thrusters incorporating Ni:Ti superconducting magnets cooled by liquid-helium cryostats. The electrical conversion efficiency for the Yamato I thrusters is only a few percent. The authors state that increasing the efficiency would require, either singly or in combination, an increase in the magnetic field strength, the size of the propulsion units, or the conductivity of the seawater. The authors also discuss the use of electromagnetic propulsion systems for pumping hazardous materials and for controlling the liquid sodium flow in breeder reactors.

A third type of application is known as Maglev. Entire transport vehicles (e.g., trains) can be suspended over guiding rails to yield a nearly frictionless high speed mode of transport. A fourth class of applications involve the sudden exchange of energy from an electromagnetic form to a kinetic form or vice versa. The former is the foundation of rail-gun kinetic energy weapons. The latter is the preferred approach for the production of MegaGauss fields in small regions through explosive flux compression.

The most general force law at work in the above applications is the Lorentz force between a current and a magnetic field: $F = \int \vec{I} \times \vec{B} \, dl$. The efficiency of such a force for accomplishing the propulsion of matter is then in general proportional to the square of the magnetic field. This is clear when the current I is induced by the magnetic field B itself. Since the power wasted is proportional to the Joule heating of the conducting material, even when the current is supplied by a separate source it is more advantageous to have a high B-field, low current system than a low B-field, high current system. Then for a constant force F, since the power lost goes as $I^2 R = [F/(Bl)]^2 R$, the advantage also goes as the square of the magnetic field. For this reason it is desirable to generate the strongest magnetic fields possible.

At present, the most efficient magnetic field generation systems utilize superconductors capable of sustaining thousands of Amperes with negligible loss. Their main disadvantages are the requirement for cryogenic cooling and the eventual limitation that high field strengths place on the superconducting state. The alternative of using conventional conductors is viewed as impractical because the high currents required to produce a strong magnetic field in a given region of space would eventually melt the conductors.

From the foregoing, it is apparent that a method by which the magnetic field produced by an electric current can be multiplied in amplitude to the desired strength so that high field strengths can be produced by current carrying conductors with minimized joule heating of the conductors is desired.

SUMMARY OF THE INVENTION

The present invention applies the well known principle of voltage amplification in electric LRC circuits to magnetic $L_m R_m C_m$ circuits, thereby providing an apparatus and a method for the amplification of magnetic fields. One advantage of the present invention is that it reduces the current loads on the metallic conductors within an electromagnetic system, assuming that the requirements on the magnetic field strength are kept constant. This advantage is due to the Joule heating load being transferred from the conventional wires to the ceramic ferrites that effect the field amplification.

In brief, a resonant magnetic field amplifier according to one embodiment of the invention consists of an alternating voltage source supplying voltage across the terminals of a solenoid wound around a non-conducting permeable core, the core containing a gap. A section of the permeable core is wound around a section of a dielectric core, the dielectric core having a very high, real permittivity. The amplification factor of this embodiment is equivalent to the ratio of $\omega L_m$ to $R_m$, where $\omega$ is the angular frequency, and $L_m$ and $R_m$ are the total magnetic inductance and the total magnetic resistance of the electromagnetic system, respectively. To obtain the maximum benefit of the amplification factor, the gap must be designed according to the invention. An improved melt levitation system is provided. utilizing the magnetic field amplification within the gap.

In a second embodiment of the invention, a solenoid is wound around a portion of a non-conducting permeable core. An alternating voltage source is connected to the solenoid. A portion of the permeable core is wound a first number of turns around a section of a dielectric core, the dielectric core having a very high, real permittivity. A second non-conducting permeable core is wound a second number of turns around a second section of the dielectric core. The second permeable core contains a gap. The amplification factor of this embodiment is defined by the ratio of the second number of turns to the first number of turns. An improved melt levitation system is provided utilizing the magnetic field amplification within the gap. In a separate embodiment of the invention, the system described above is used to match the magnetic impedance of a transmission line to that of a voltage source.

A further understanding of the nature and advantages of the present invention may be realized by reference to the remaining portions of the specification and the drawings.

DESCRIPTION OF THE PREFERRED EMBODIMENT

The concept of magnetic circuits is used with advantage in the design of magnets and electromagnetic machinery. In such applications it is common to draw an analogy between a DC electric circuit and an arrangement of permeable materials in the presence of a magnetic field source (e.g., a solenoid). This analogy draws an equivalency between the DC voltage source which provides an electromotive force, emf, and the magnetomotive force of the solenoid winding. Thus, in the same way as the voltage source drops voltage across series resistances in its path, the magnetomotive force is dropped across the series reluctances in its path. Therefore reluctance is given by the expression $R=l/(\mu A)$, where $\mu$ is the permeability of the material carrying the magnetic flux, l is its length, and A is its cross-sectional area. Clearly an air gap (i.e., $\mu=\mu_0$) in series with a highly permeable core (i.e., $\mu>>\mu_0$) has a significant effect on the overall reluctance of the circuit.

The traditional analogy between reluctance and resistance has been found to be inappropriate since it only works when the circuit is viewed in the limit as frequency goes to zero. To obtain the proper analogy the full duality between dielectric materials and magnetic materials must be invoked. This was originally effected in 1892 by Oliver Heaviside, *Electric Papers,* chap. XXX, sec. III, 441 (2nd ed. 1970). Heaviside conceived of a quantity analogous to electric current which he termed magnetic current. He defined the magnetic current as $G=fH+[\mu/(4\pi)][\partial H/\partial t]$. The second term on the right hand side of the equation is the conventional rate of change of the magnetic induction. Heaviside introduced the first term: the magnetic conduction current which can only exist if magnetic conductivity f exists.

Although magnetic conductivity has never been observed to exist at zero frequency (i.e., DC), it is clear that in the presence of alternating currents it can exist. In particular, by letting the magnetic field be harmonic with a time dependence $e^{j\omega t}$, and identifying $\mu=\mu'$ and $\omega\mu''=4\pi f$, then the magnetic current equation can be rearranged into:

$$4G=\omega\mu''H+j\omega\mu'H=j\omega H(\mu'-j\mu'')$$

It is also clear that a material with a complex permeability containing a lossy or imaginary part, $\mu''$, behaves as if it were carrying a magnetic conduction current.

Although Heaviside assumed the magnetic conductivity to be small, the present derivation assumes that it is very large. It is assumed that the magnetic conductivity is large enough to overwhelm the properties of the material in the same way that a metal's conductivity overwhelms its dielectric properties. It is then straightforward to show that such a material, driven by a harmonic magnetomotive force, can be made to display many characteristics analogous to those found in AC electric circuit elements. Therefore just as the electric inductance-capacitance-resistance (LRC) circuit is the foundation of a vast array of practical applications, a new magnetic inductance-magnetic capacitance-magnetic resistance ($L_m R_m C_m$) circuit is proposed as the foundation for the present invention.

I. Dual Circuit Parameters

Figure 2:
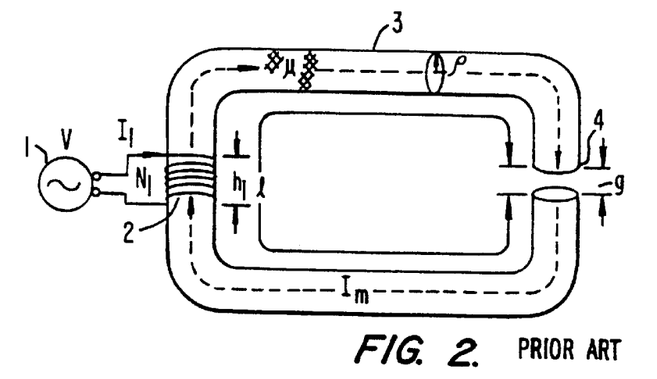
FIG. 2 is an illustration of a simple magnetic circuit according to the prior art.

The prior art magnetic circuit of FIG. 2 consists of an alternating voltage source 1 supplying voltage V connected across the terminals of a solenoid 2 of height $h_1$ with $N_1$ turns carrying the current $I_1$. Solenoid 2 is wound on a non-conducting permeable core 3 of complex permeability $\mu$, where $\mu$ is equivalent to $\mu'-j\mu''$, and where $\mu'$ is the real part of the complex magnetic permeability and $\mu''$ is the imaginary part. Permeable core 3 has a total length l, a cross-section radius $\rho$ and its two ends are parallel to each other but separated by a gap 4 of length g.

Solenoid 2 provides a magnetomotive force $mmf_1=I_1N_1$ which must equal the circuital line integral of the magnetic field throughout the whole flux path. Assuming no leakage into the surrounding space, the flux flowing through core 3 must traverse gap 4 unchanged. Therefore, if for simplicity we assume that the end faces of core 3 and gap 4 have the same radius as the cross-sectional radius of the core, the B-field in core 3 and gap 4 are equal (as would be demanded by the electromagnetic boundary condition on the normal B-field). Then $$mmf_1 = I_1 N_1 = \oint \vec{H} \cdot \vec{dl} = (B/\mu)l + (B/\mu_0)g \quad (1)$$

Multiplying the numerator and denominator of each term on the right hand side by the angular frequency $\omega$ and the complex number $j=(-1)^{1/2}$ and separating the core permeability into real and imaginary parts, equation 1 becomes:

$$mmf_1 = [(j\omega\mu'Hl + \omega\mu''Hl)/(j\omega\mu' + \omega\mu'')] + [(j\omega\mu'Hg + \omega\mu''Hg)/(j\omega\mu_0)] \quad (2)$$

Now select the magnetic permeable material to have a natural or induced spin resonance at or just below the operating frequency, thus allowing $\mu''$ to be much greater than $\mu'$. Such materials exist in nature, with spin resonances conveniently ranging from the kHz (e.g., manganese zinc ferrites) into the MHz range (e.g., nickel zinc ferrites). A magnetic conductivity $\sigma_m=\omega\mu''$ is defined such that a magnetic conduction current density $J_m$ can be defined as $J_m=\sigma_m H$. Then equation 2 simplifies to:

$$mmf_1 = [(J_m l)/\sigma_m] + [(J_m g)/(j\omega\mu_0)] \quad (3)$$

Multiplying the numerators and denominators by the cross-sectional area of core 3 (i.e., $\pi\rho^2$), rearranging terms and identifying the total magnetic current as $I_m=J_m\pi\rho^2$, yields:

$$mmf_1 = I_m/G_m + I_m/(j\omega C_m) \quad (4)$$

where $G_m$ is the total dual magnetic conductance which is the reciprocal of the total dual magnetic resistance, $$G_m = (\sigma_m \pi\rho^2)/l = 1/R_m \quad (5)$$

and $C_m$ is the dual magnetic capacitance of the gap, $$C_m = (\mu_0 \pi\rho^2)/g \quad (6)$$

For these circuit elements to be useful they must be designable. A variety of values must be obtainable by geometry and material choice to allow a required circuit operation to take place in a given application. Clearly, the core material and geometry can be used to obtain a variety of magnetic resistances. Magnetic materials exist ranging from very lossy to virtually lossless. However, it is not clear from the above that given a choice for the magnetic resistance, the magnetic capacitance is truly designable.

This doubt arises because if the gap is as described, submerged in air, the capacitance term has a minimum limit. That is, when the two faces of the gap are allowed to become arbitrarily separated, we can only lower the total capacitance to the series sum of the self capacitance of each face to infinity, which is of the order of $\pi\mu_0\rho$. Trying to depress the capacitance below this limit by narrowing down the gap faces (reducing the cross-sectional area locally) will not work because the flux will still leak out over a larger area. However, by taking advantage of the eddy currents induced in conductors by the alternating magnetic field in the gap, it is possible to depress the magnetic capacitance below this value. For example, if a metal sheet with a hole smaller than the cross-sectional area of the core is inserted into the gap, the magnetic flux will be forced to flow through this smaller area by the eddy currents induced in the sheet. This effect is exploited in the present invention, for example by immersing the gap in a conducting fluid. Using this technique, small magnetic capacitances can be obtained. Large capacitances are not difficult to achieve since the gap can be made arbitrarily small.

All that is missing from the desired $L_m R_m C_m$ circuit is the magnetic inductance. This is derived as follows.

The changing magnetic flux inside core 3 will induce a circulating electric field inside the core and in the surrounding space. By Maxwell's equations, this field is driven by a circuital electromotive force (emf) so that:

$$emf = \oint \vec{E}_{induced} \cdot \vec{dl} = -j\omega \int \vec{B} \cdot \vec{da} \quad (7)$$

Since all quantities are harmonic in time, the changing electric field then constitutes a changing electric displacement flux so that there is an induced back mmf due to:

$$mmf = \oint \vec{H} \cdot \vec{dl} = j\omega \int \vec{D} \cdot \vec{da} = j\omega \int \epsilon \vec{E}_{induced} \cdot \vec{da} \quad (8)$$

This back mmf has an internal component due to the displacement flux crossing the inside of core 3 (which can have a substantial dielectric constant ranging from 10 to $10^4$) and an external component from the total flux in the surrounding space. Assuming that the frequency of operation is to be in the MHz range, the core choice would be a nickel zinc type of ferrite with a natural spin resonance in the MHz range and a dielectric relaxation in the kHz range. In this case, the relative permittivity of core 3 would be of the order of 10, minimizing the internal contribution. Whatever the choice of the materials it is clear that this back mmf of equation 8 is entirely equivalent to the back emf that wires experience in the presence of alternating currents due to self inductance. In other words, a core of high imaginary permeability, carrying an alternating magnetic current, also sees a magnetic inductance.

Figure 3:
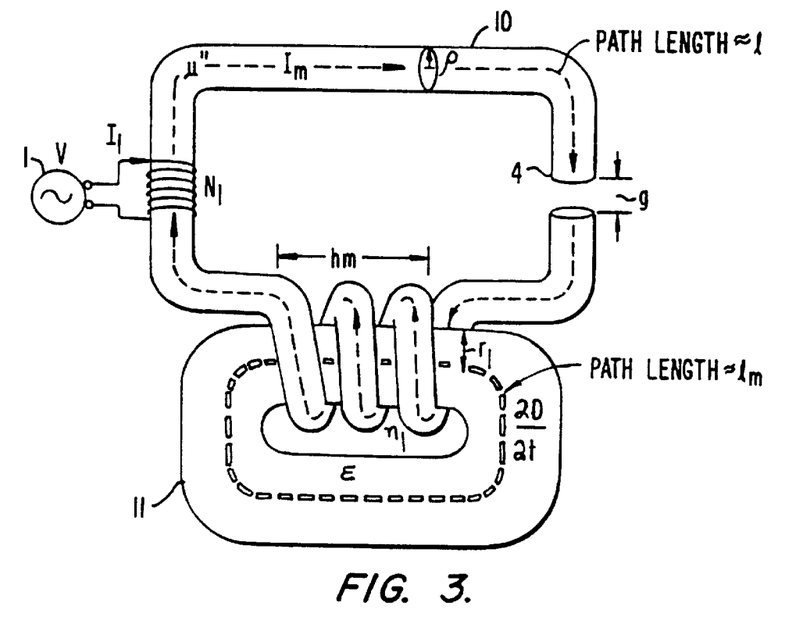
FIG. 3 is an illustration of a magnetic circuit in which a section of the magnetic core has been wrapped around a dielectric core of very high, real permittivity.

To maximize this term, consider the configuration of FIG. 3 where a section of a magnetic core 10 has been wrapped around a dielectric core 11 of very high, real permittivity. In effect, magnetic core 10 becomes a dual solenoid of $n_1$ turns, internal radius $r_1$ and length $h_m$.

The electric field inside the solenoid is given by the total electromotive force $n_1 I_m$ dropped across the length $l^m$ of dielectric core 11:

$$E = (n_1 I_m)/l_m \quad (9)$$

The alternating displacement vector is then:

$$D = (\epsilon n_1 I_m)/l_m \quad (10)$$

Leading to a total back mmf accumulated over the $n_1$ turns of:

$$mmf_{ind} = n_1 \cdot j\omega [(\epsilon n_1 I_m)/l_m] \pi r_1^2 \quad (11)$$

where we identify the magnetic inductance as $L_m = (\epsilon n_1^2 \pi r_1^2)/l_m$. The value of this inductance is clearly controlled by the material and geometry chosen for the dielectric core. Therefore, the magnetic circuit of FIG. 3 is the desired $L_m R_m C_m$ circuit and it is resonant, per the equation:

$$mmf = I_m R_m - [j/(\omega C_m)] I_m + j\omega L_m I_m \quad (12)$$

where all inductive terms, including the self, are lumped into the $L_m$. Solving for the total magnetic current:

$$I_m = (I_1 N_1)/[R_m - j/(\omega C_m) + j\omega L_m] \quad (13)$$

The effect of this magnetic current on the driving voltage source can be deduced as follows. Assume that the voltage source-solenoid combination has negligible circuit capacitance, then the voltage supplied by source 1 must be dropped across the ohmic resistance of the solenoid wire and the opposing back emf of the solenoid's inductance. The latter is a result of equation 7. For $N_1$ turns of wire the total induced voltage is:

$$V_{ind} = N_1\{-j\omega B \pi \rho^2\} = N_1\{-j\omega(\mu' - j\mu'')H\pi\rho^2\} \cong N_1\{-\omega\mu''H\pi\rho^2\}$$

so that:

$$V_{ind} = -N_1 I_m \quad (14)$$

Together, equations 13 and 14 give the relationship between the magnetic dual circuit elements and the source voltage:

$$V_1 = I_1\{R_{wire} + [N_1^2/(R_m - j/(\omega C_m) + j\omega L_m)]\} \quad (15)$$

II. Methods for the Amplification of Magnetic Fields

1. The Resonant Amplifier

The magnetic $L_m R_m C_m$ circuit defined by equation 13 can be utilized as a resonant magnetomotance amplifier analogous to resonant electric LRC circuits. In conventional LRC circuits it is known that if the inductive term and the capacitive term are made equal to each other, the electric current in the circuit is only limited by the small resistance of the wire. The flow of this large current through the reactances of the inductor and capacitor can develop a large voltage. The requirement for voltage amplification is that the reactances of the inductor and capacitor be greater than the resistance of the wire (in other words, that the Q of the circuit be large). The same principle applies in the case of the dual magnetic resonant circuit.

As an example of a dual magnetic resonant circuit, consider the arrangement of FIG. 3 where l, the total length of core 10, is $\lambda/71$, and where $\lambda = 2\pi c/\omega$. Let l be as small as possible, on the order of $l \cong 3h_m + n_1 2\pi r_1$. Let $r_1$, the internal radius of the dual solenoid, equal $10\rho$.

If $h_m = n_1 2\rho$, then by winding both sides of magnetic core 10 around dielectric core 11, $l_m$ can be made to be less than or equal to $2h_m$.

And we have $l = 69 n_1 \rho$, which implies that $\rho = \lambda/4899 n_1$.

Now, the ratio between $\omega L_m$ and $R_m$ is $$Q_m = [(\omega n_1^2 \epsilon \pi r_1^2)/2h_m][(\omega \mu''\pi \rho^2)/l] = (\omega^2 \epsilon_0 \mu_0 n_1^2 \pi^2 \mu_r'' \epsilon_r 100 \rho^4)/ (2n_1^2 138 \rho^2) = 141.1[(\mu_r'' \epsilon_r \rho^2)/\lambda^2] \quad (16)$$

With $l = \lambda/71$ the magnetic $Q_m$ becomes:

$$Q_m = 5.93 \times 10^9 [(\mu_r'' \epsilon_r)/n_1^2] \quad (17)$$

Finally, if we assume for simplicity only one turn of the dual solenoid (i.e., $n_1 = 1$) and if the relative permeability of core 10 is of the order of 5000 and the relative permittivity of dielectric core 11 is also the same (e.g., barium titanate ceramics), then $Q_m = 147$. In other words:

$$\omega L_m = 147 R_m \quad (18)$$

which at resonance must also equal $1/(\omega C_m)$.

The condition for resonance is then:

$$g/(\omega \mu_0 \pi \rho^2) = 147[l/(\omega \mu_r'' \mu_0 \pi \rho^2)] \quad (19)$$

So that, $$g \cong 0.02941 \cong 2\rho \quad (20)$$

Therefore a magnetic circuit with the design parameters given above will resonate when gap 4 is of the order of the diameter of magnetic core 10, with a $Q_m$ of 147. $Q_m$ is the magnetic field amplification factor. This is proven as follows.

By the continuity of normal B, neglecting fringing, the flux inside magnetic core 10 must continue inside gap 4. That is:

$$-j\mu'' H_{core} \pi \rho^2 = \mu_0 H_{gap} \pi \rho^2 \text{ or } H_{gap} = -j\mu_r'' H_{core} \quad (21)$$

Since at resonance the whole magnetomotive force drops across the $R_m$ term, $$H_{core} = (I_1 N_1)/l = (I_1 N_1)/33.7 \, g \quad (22)$$

And equation 21 becomes $$H_{gap} = -j147[(I_1 N_1)/g] \quad (23)$$

If instead of this resonant magnetically conducting core a conventional core of real permeability and with no resonance had been used in the configuration suggested in FIG. 2, it is well known that all the mmf supplied by the current would be dropped across the gap. Thus, in conventional arrangements the magnetic field produced by the current $I_1$ in a gap of size g is:

$$H_{conventional} = (I_1 N_1)/g \quad (24)$$

Therefore, an amplification of a factor of $Q_m$ has been accomplished by the disclosed invention. The current through the wire solenoid has not been increased. The increased magnetic field power density comes from an increased electric field power density at the supplying voltage source since the voltage is higher than that required to flow $I_1$ through the wire resistance, according to equation 15.

Clearly, larger values of permeability, permittivity and the total length of the magnetic circuit relative to the free space wavelength all increase the $Q_m$ amplification factor proportionately. However, to insure resonance as $Q_m$ is increased, the magnetic capacitance must be made correspondingly smaller. In electric circuits there is a limit to this process since as two capacitor plates are eparated, the circuit capacitance does not go to zero but ends to the limit of one half of the self capacitance between each plate and infinity. In the magnetic circuits of the present invention, however, it is possible to go below this limit by using conducting fluids.

2. Magnetomotance Step-Up Transformer

The second example of the amplification of magnetic fields parallels the amplification of voltages in step-up transformers. Consider the magnetic circuit of FIG. 4. Voltage source 1 is driving an electric current $I_1$ through the solenoid which constitutes a magnetomotive force $mmf_1 = I_1 N_1$ driving a magnetic current $I_{m1}$ in a first magnetically conducting core 15. Core 15 is assumed to form a closed circuit and to be wound in $n_1$ turns around a dielectric toroid 16 of cross-sectional radius $r_1$ and permittivity $\epsilon$. It is assumed that in first core 15 the $\omega L_m$ term is greater than its $R_m$ term and dominates the behavior. A second magnetically conducting core 17 is wound $n_2$ turns around toroid 16 and left open at a gap 4 of size g.

Figure 4:
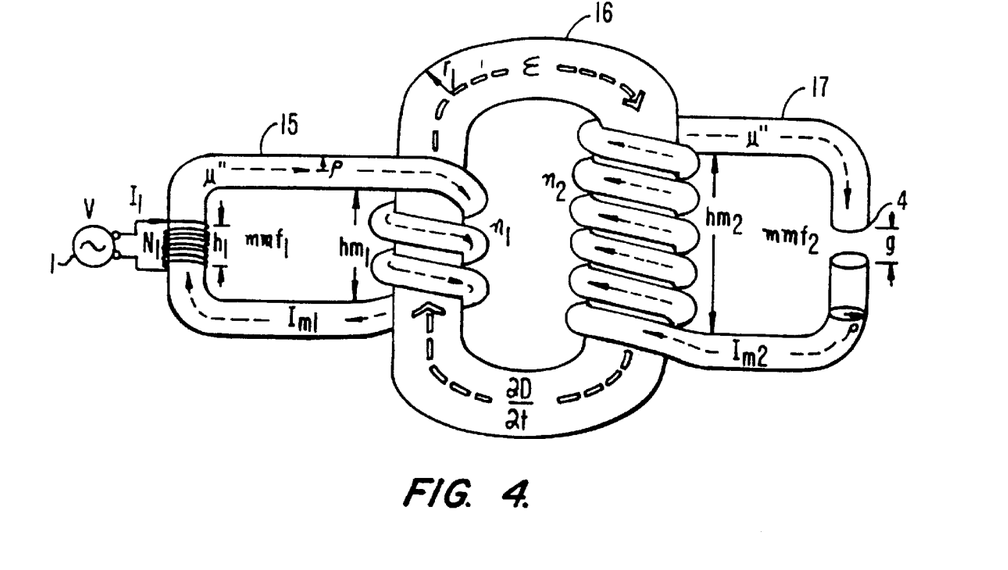
FIG. 4 is an illustration of a magnetic step-up transformer.

It has already been shown by equation 10 that the dielectric displacement inside toroid 16 due to the flowing $I_{m1}$ is $D=(\epsilon n_1 I_{m1})/l_m$. This displacement vector alternating through the toroid's cross-sectional area inside the dual solenoid made by second magnetic core 17 induces, by equation 11, a magnetomotive force of $mmf_2=n_2 \cdot j\omega[(\epsilon n_1 I_{m1})/l_m]\pi r_1^2$ on the second solenoid. If the capacitive term of the gap in the second core can be made to dominate the behavior, then all this $mmf_2$ will be dropped across gap 4. Recognizing that for the first core being dominated by $\omega L_m$ means that $mmf_1=n_1 \cdot j\omega[(\epsilon n_1 I_{m1})/l_m]\pi r_1^2$:

$$H_{gap}=mmf_2/g=[n_2/n_1][mmf_1/g]=[n_2/n_1][(I_1 N_1)/g]=[n_2/n_1]H_{conventional} \quad (25)$$

Again, the magnetic field inside the gap has been made greater than could be accomplished with the same current in a conventional arrangement. This time the amplification factor is the turns ratio $n_2/n_1$.

The success of this step-up scheme for amplification lies in the ability to make the dual reactance of the magnetic capacitance component dominate the circuit of the second permeable core. To accomplish this, the term $C_m$ must be made as small as possible. As previously discussed, in a free space environment this is impossible because the lower limit of $C_m$ is of the order of $\pi\mu_0\rho$. To prove this, note that the capacitive reactance is of the order $1/(\omega\pi\mu_0\rho)$ whereas the inductive is $\omega L_m=(\omega\epsilon n_2^2 \pi r_1^2)l_m$. Letting $l_m=2h_{m2}=4\rho n_2$ and $r_1=10\rho$ as before and defining P as the ratio of the capacitive reactance to the inductive, then:

$$1/(\omega C_m)=P\omega L_m \text{ or } P=[1/(\omega\pi\mu_0\rho)][l_m/(\omega\epsilon n_2^2 \pi r_1^2)]=(4\rho n_2)/(\omega^2\mu_0\epsilon_0\epsilon_r n_2^2 \pi^2 100\rho^3) \quad (26)$$

which, using the design parameters from section II [1] described above, reduces to:

$$P_{freespace}=0.98/n_2 \quad (27)$$

Since $n_2$ is greater than 1, it is clear that in free space we cannot meet the requirement of P>1, and the capacitive term will not dominate. However, if the gap is immersed inside a conducting fluid the magnetic flux in the gap will induce an electromotive force that will drive volumetric eddy currents in the fluid.

In such an arrangement the driving emf on the order of $I_m$ works against an impedance equal to the sum of the resistance through the fluid plus the self-inductance of the circulating current. Defining the self-inductance of the circulating current as $L_{eddy}$, then:

$$I_{eddy} \cong I_m/(R_{eddy}+j\omega L_{eddy}) \quad (28)$$

And this $I_{eddy}$ constitutes the back mmf on the magnetic circuit. If the fluid conductivity is high enough, the current is inductance limited and $I_{eddy} \cong I_m/(j\omega L_{eddy})$. Adding this term to the other back mmf's in equation 12 gives:

$$mmf=I_m R_m-[j/(\omega C_m)]I_m+j\omega L_m I_m-[j/(\omega L_{eddy})]I_m \quad (29)$$

From equation 29 it is clear that the eddy current term in the conducting fluid is in phase with, and therefore increases, the magnetic capacitive reactance. In fact, we can combine the two terms into one and define the magnetic capacitive reactance $1/(\omega C_m)$ to be of the order of $1/(\omega\mu(\omega)\rho)$. Here $\mu(\omega)$ is the effective permeability of the conducting medium as a function of frequency.

Figure 5:
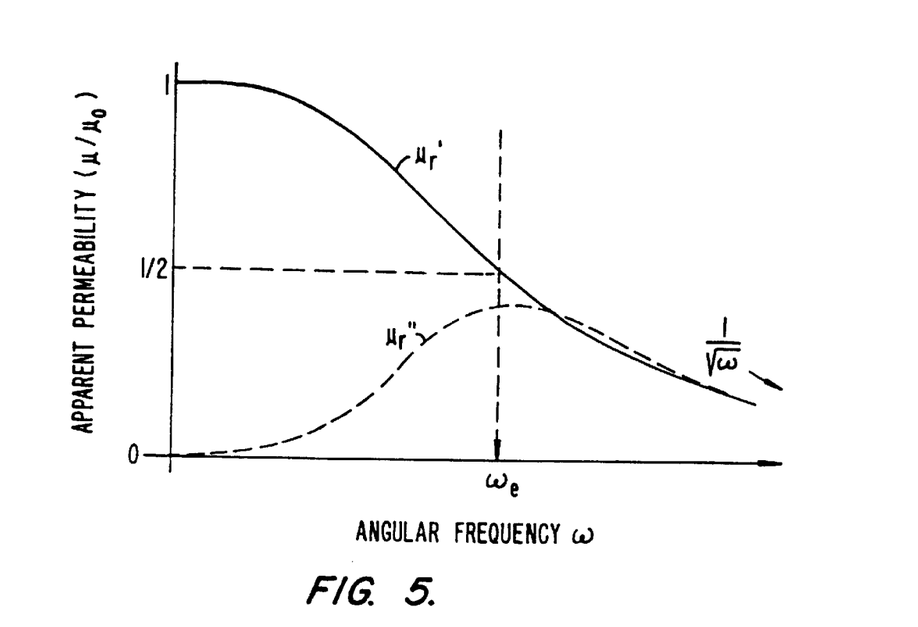
FIG. 5 is a graph of the apparent permeability versus the angular frequency for a specific system of conductors.

For a system of conductors (such as laminated magnetic metal cores) of characteristic dimension t, $\mu(\omega)$ has the behavior shown in FIG. 5. FIG. 5 illustrates that when the frequency is such that the characteristic dimension is of the order of two skin depths, the real permeability has dropped to half the free space value and an imaginary component arises of approximately the same magnitude. This frequency is called the eddy frequency, $f_e$, which is equal to $\omega_e/(2\pi)$. As the frequency increases both $\mu'$ and $\mu''$ drop as $1/\omega^{1/2}$. Therefore, if the frequency is significantly greater than the eddy frequency, $\mu(\omega) \approx \mu_0(\omega_e/\omega)^{1/2}$.

If the conducting fluid is sea water (i.e., conductivity approximately 5 mhos/meter) and the characteristic dimension g is equal to 2 meters, this eddy frequency is 0.04 MHz. If the circuit operates at 50 MHz then $\mu(\omega)$ is equal to 0.028 $\mu_0$, which increases the magnetic capacitive reactance by a factor of 35. This makes the ratio P of the capacitive reactance to the inductive reactance of equations 26 and 27 of the order of 3.5 for a secondary core of $n_2=10$ turns. In this instance 78% of the $mmf_2$ is dropped across the gap or 7.8 $mmf_1$. If $n_2=20$ turns, the ratio P is 1.75 and 64% of the $mmf_2$ is dropped across the gap or 12.7 $mmf_1$. Therefore it is straightforward to obtain an amplification of one order of magnitude using the step-up principle in sea water.

3. Step-Up Transformer Pump

As discussed above, if the gap in the step-up transformer configuration is immersed in a conducting fluid, strong eddy currents are induced in the fluid. Due to the reaction of the currents in the fluid to the amplified magnetic field, the fluid in the gap is expelled radially outwards from the gap. This outward force can be used in a variety of applications.

The simplest application of the outward force on the fluid within the gap is to use the step-up transformer configuration as a magnetic fluid stirrer. For this application the step-up transformer does not have to be modified, the gap is simply immersed in the fluid to be stirred.

Figure 6:
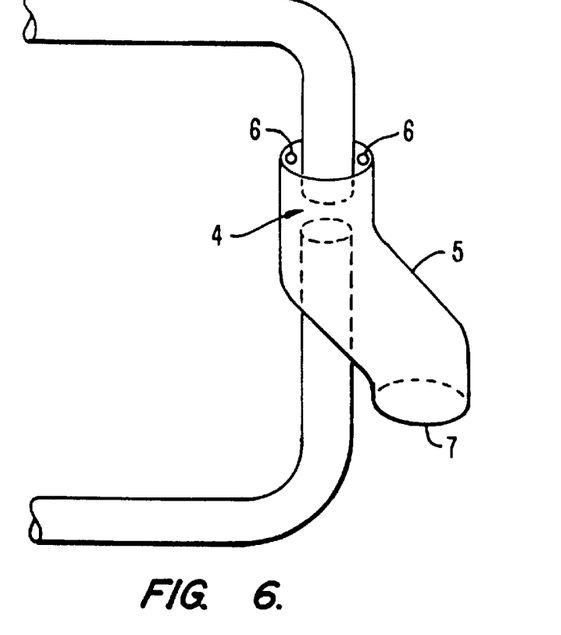
FIG. 6 is an illustration of a magnetic step-up transformer configured to function as a fluid pump.

A more useful application is to channel the force exerted on the fluid within the gap, thereby creating a fluid pump. One method of channeling the fluid flow is shown in FIG. 6. Surrounding gap 4 is a fluid redirection skirt 5 containing both a plurality of fluid intake ports 6 and a fluid exhaust nozzle 7. Skirt 5 is made of a material which is essentially transparent to the electromagnetic waves; plastic in the preferred embodiment. As the fluid is expelled outwards from the gap, the skirt redirects the outward flow through exhaust nozzle 7, generating a propulsive force.

4. Resonant Magnetic Step-Up Transformer

This method is a combination of the resonant amplifier and the magnetomotance step-up transformer described above. In this case both the primary and secondary cores are tuned to resonance through the suitable arrangement of all dual capacitances and inductances. The stepped up mmf then gets multiplied by the resonance amplification to obtain a total magnetic field amplification in the gap that is as a minimum, the product of the two amplifications disclosed in the preceding two sections (greater than 2 orders of magnitude) and as a maximum could be a quantity comparable to the voltage amplification obtained in a Tesla coil (six orders of magnitude) provided magnetic materials with extremely high magnetic conductivity are used.

5. Quarter Wave Resonant Amplifier

Figure 7:
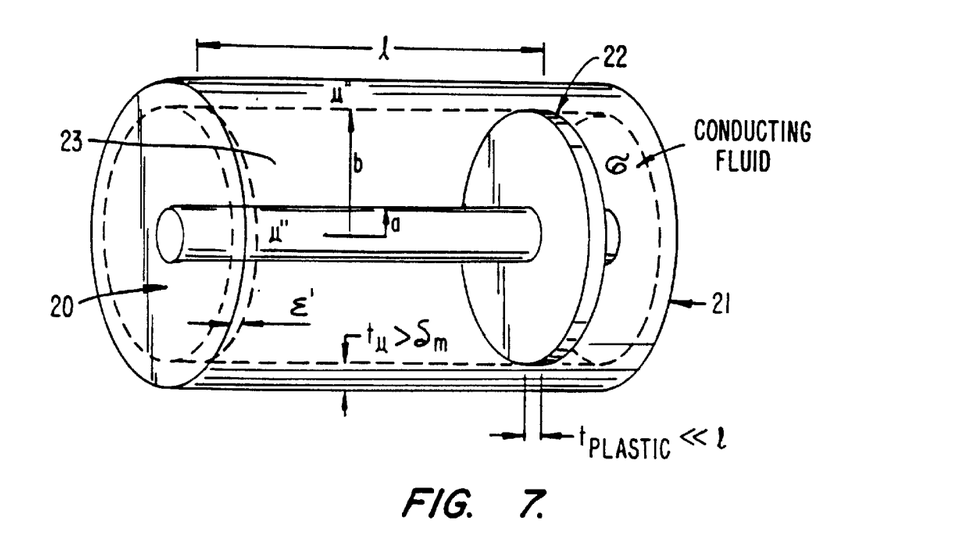
FIG. 7 is an illustration of a quarter wave resonant amplifier.
Figure 8:
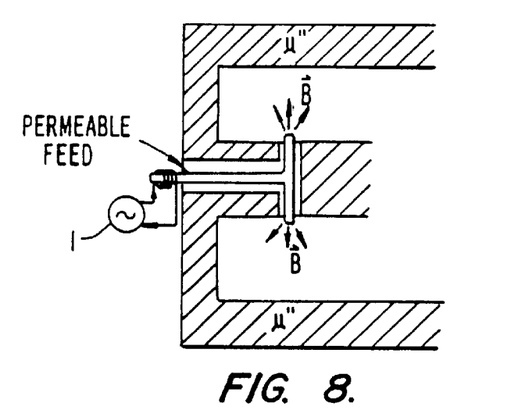
FIG. 8 is the structure illustrated in FIG. 7 with a small mmf introduced near the shorted end.

FIG. 7 is an example of a quarter wave resonant amplifier. It consists of a dual coaxial transmission line constructed from a lossy permeable material, shorted at end 20 by the same material. End 21 is left open and sealed against surrounding external conducting fluid by a plastic barrier 22. Since a conducting fluid has been shown to enhance the magnetic capacitive reactance term, the open end 21 of the dual transmission line so constructed can truly approach the ideal definition of a magnetic open circuit. When a small mmf is introduced into this structure near shorted end 20, as suggested by the connection scheme of FIG. 8, a standing wave will be set up inside with a minimum of magnetic field strength at shorted end 20 and a maximum at open end 21 in the fluid. This constitutes a dual quarter wave resonant line section.

To derive the equations of the dual coaxial line assume the line is filled with a low loss dielectric 23. Because the walls of the coaxial waveguide are made of a lossy magnetic material, the tangential magnetic field tends to vanish on their surface. As a result, the structure supports a TEM mode in which the magnetic field is purely radial (normal to the coaxial surfaces) and the electric field circulates tangential to the same. The magnetic skin depth inside the lossy magnetic material is:

$$\delta_m = [2/(\omega \epsilon \sigma_m)]^{1/2} \quad (30)$$

The magnetic impedance (which has the units of a conventional admittance) of the transmission line is then:

$$\zeta = [(R_m + j\omega L_m)/(j\omega C_m)]^{1/2} \approx [L_m/C_m]^{1/2} = [\epsilon_0/\mu_0]^{1/2} [\epsilon_r]^{1/2} [1/(2\pi)] \ln(b/a) \quad (31)$$

where the $R_m$, $L_m$ and $C_m$ are per unit length.

For a resonant quarter wave section of line a small "voltage" input 1 near shorted end 20 appears greatly amplified at open end 21 by the factor:

$$Q_m = (2\zeta)/[R_m(\lambda/4)] \quad (32)$$

If the thickness of the magnetic conductors is greater than the magnetic skin depth, the magnetic resistance per unit length is just:

$$R_m = [1/(\sigma_m \delta_m)]\{[1/(2\pi a)] + [1/(2\pi b)]\} = [\epsilon/(2\mu'')]^{1/2}\{[1/(2\pi a)] + [1/(2\pi b)]\} \quad (33)$$

In a typical embodiment filling dielectric 23 would be a ceramic of high dielectric strength in order to withstand the amplified electric field inside the transmission line and its relative permittivity would be chosen to be 200. With this dielectric and a frequency of operation of 25 MHz, the quarter wave length, l, is 0.21 meters. If the imaginary part of the relative permeability of the magnetic conductor is 5000 (either natural or enhanced through ferromagnetic resonance in the presence of an applied DC magnetic field) and the real part of its permittivity is on the order of 10, then the magnetic skin depth, $\delta_m$, is 0.012 meters. For an inner coax cylinder's outer radius, a, of 0.0381 meters and an outer coaxial shield's inner radius, b, of 0.105 meters, then the magnetic resistance per unit length is 0.000478 mhos/meter, while the transmission line magnetic impedance is 0.00606 mhos, yielding an amplification factor of $Q_m$=120.8.

6. Quarter Wave Resonator Levitation System

Figure 9:
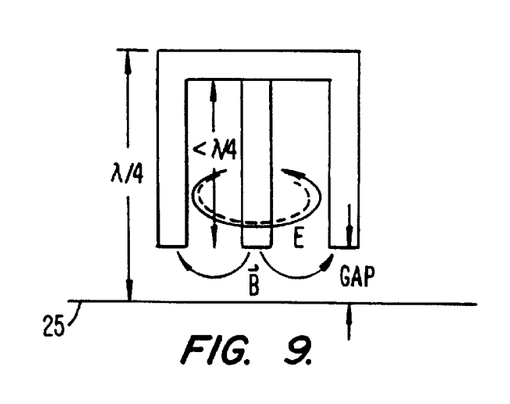
FIG. 9 is an illustration of a quarter wave resonant amplifier configured to function as a simple levitator.

The quarter wave resonant amplifier can be reconfigured to act as a simple levitator. In this configuration the resonator of FIG. 7 does not contain barrier 22. Instead of immersing the device in a conducting fluid, an electrically conducting ground plane 25 is placed at end 21 as shown in FIG. 9. In this configuration, the resonator would float approximately a quarter wave above the ground plane. Even though there is a gap, the energy in the resonator tends to be trapped inside the device. It cannot leak out because the electric field inside the device is circular and tangential to the ground plane. Such a wave cannot propagate over the ground.

7. Magnetic Material Requirements

Regardless of the configuration of the magnetic amplifier, the magnetic materials employed in the amplifier must be sufficiently lossy. It is imperative that the imaginary part of the complex permeability be much greater than 1 at the magnetic amplifier's frequency of operation so that the lossy permeable core will behave as the magnetic equivalent of a metallic conductor. Generally this requires that if the frequency of operation is to be in the MHz range, $\mu''$ is of the order of 1000 to 5000 times $\mu_0$. For other frequencies of operation, the product of the imaginary permeability and the frequency must be kept approximately constant. Therefore, if the frequency of operation is to be in the kHz range, $\mu''$ is of the order of $10^6$ to $5\times10^6$ times $\mu_0$ while if the frequency of operation is to be in the GHz range, $\mu''$ is of the order of 1 to 5 times $\mu_0$.

The characteristics of magnetic materials are well known and therefore it is simply a matter of selecting an appropriate material for a specific application, appropriateness being based on the material's permeability for the intended frequency of operation, its mechanical characteristics, its availability in the desired sizes, its ability to withstand the intended environment, and its cost.

In general, the peak imaginary permeability is of the order of one half to one times the initial permeability. Therefore, manganese zinc ferrite classes III and IV with initial permeabilities on the order of 3000 to 20,000 and 2000 to 5000, respectively, as well as class VI nickel zinc ferrites with an initial permeability of 1000, are excellent candidates for a variety of magnetic amplifier applications. In the GHz range, cobalt zinc ferrites have suitable properties. It is also possible to achieve a fully controlled high lossy permeability by applying an external DC magnetic field to the magnetic core, this technique of controlling a material's permeability being well known in the art.

III. Specific Examples

1. Resonant Magnetic Circuit Melt Levitation System

In this example an electromagnetic melt levitation system operating at 100 kHz is described according to the present invention. The levitation force is produced by the interaction between the flux and the eddies induced in the metal sample.

This embodiment utilizes the basic design structure illustrated in FIG. 3. In this embodiment dielectric core 11 is a toroid made of Crowloy 70. It has a rectangular cross section 0.94 meters wide by 0.3 meters thick and it offers a circular path to the displacement vector of mean radius 0.35 meters. At 100 kHz: $\epsilon'/\epsilon_0$=123,000; $tg\delta_d$=0.64×10$^{-4}$; $\mu'/\mu_0$=400; and $tg\delta_m\approx0$. Magnetic winding 10 is made of manganese zinc ferrite according to the composition disclosed by E. Roess in Magnetic Properties and Microstructure of High Permeability MnZn Ferrites, *Ferrites: Proceedings of the International Conference,* July 1970, Japan, 203–209. The radius of the magnetic winding, ρ, is 0.01 meters and has a total length of 419 meters. At 100 kHz: $\mu'' \geq 10^4 \mu_0$. Magnetic winding 10 is wound around the dielectric core in three layers of windings for a total of 159 turns ($n_1$). Source 1 is 4 turns of 000 gauge copper wire wound around a section of magnetic winding 10.

The total magnetic resistance per equation 5 is:

$$R_m = 1/(\sigma_m \pi \rho^2) = 1/(\omega \mu'' \pi \rho^2) = 419/[(2\pi)(10^5)(10^4)(4\pi)(10^{-7})(\pi)(0.01)^2] = 169 \text{ mhos}$$

The magnetic inductance per equation 11 is $\epsilon n_1^2 A/l_m$ where A is the cross-sectional area of dielectric core 11 and $l_m$ is its mean length. In this case A=0.3×0.94=0.282 m² and $l_m \approx 2\pi(0.35)=2.2$ m. Therefore the magnetic inductive reactance term is:

$$\omega L_m=[(123000)(8.854)(10^{-12})(2\pi)(10^5)(159)^2(0.282)]/2.2=2217 \text{ mhos}$$

Therefore the multiplication factor for the magnetic field is:

$$Q_m=2217/169=13.$$

Figure 10:
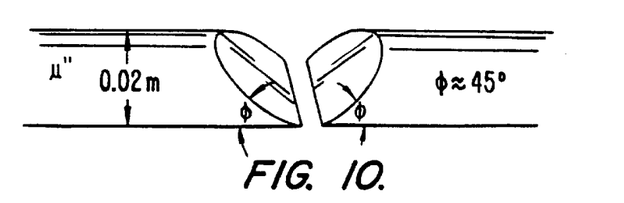
FIG. 10 is an illustration of the termination of the gap ends for a melt levitation system.
Figure 11:
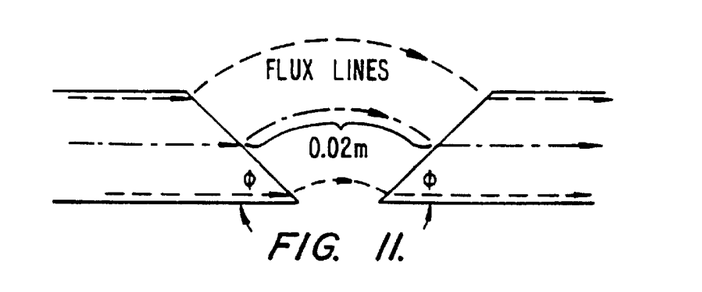
FIG. 11 is an illustration of the flux lines for the gap shown in FIG. 10.

To use this system as a melt levitation system the ends of the gap are terminated as shown in FIG. 10. The flux lines for this gap are shown in FIG. 11. The mean magnetic flux path is on the order of 0.02 meters. In air, the magnetic capacitance of the gap is approximately $\mu_0\pi(0.01)^2/0.02$ and the magnetic capacitive reactance is $1/\omega C_m$ or 80.6 mhos.

Figure 12:
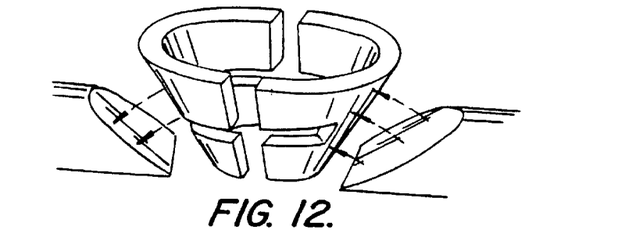
FIG. 12 is an illustration of a flux concentrator.
Figure 13:
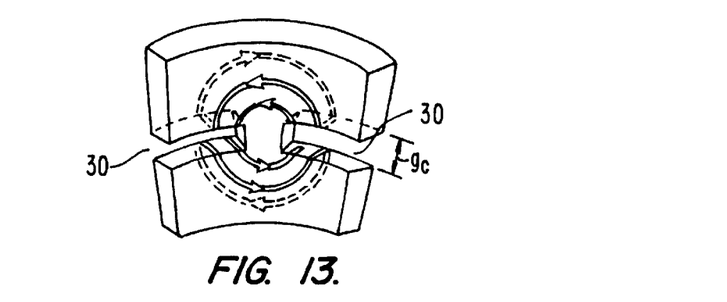
FIG. 13 is an illustration of the eddies induced in the flux concentrator of FIG. 12 due to the magnetic flux in the gap.

To guarantee resonance, a water cooled cold crucible is designed which also acts as a flux concentrator as shown in FIG. 12. The concentrator shapes the field within the gap and drops $C_m$. The magnetic flux in the gap induces eddies in the flux concentrator as shown in FIG. 13. The eddies induced on the back wrap around to the front, effectively forcing the magnetic flux to flow through the gaps 30 in the concentrator and fan out within the interior.

Figure 14:
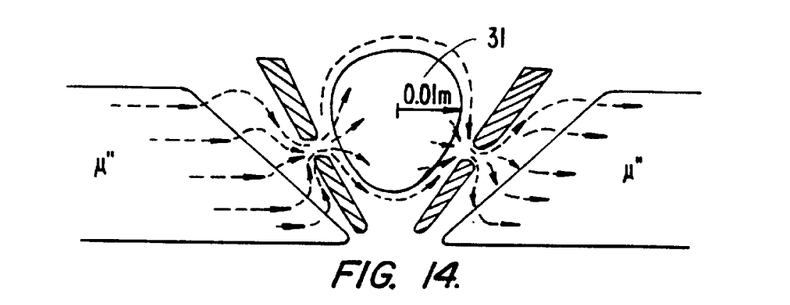
FIG. 14 is a cross-sectional view of the gap and concentrator shown in FIGS. 10–13 with a metal sample to be levitated in place.

FIG. 14 is a cross-sectional view of the gap and concentrator with a metal sample 31 to be levitated in place. If the combination of the crucible gap flux compression and the eddies induced in the levitated metal reduce the magnetic flux path cross-section by a factor of 27.5, $C_m$ is dropped by the same factor and $1/(\omega C_m)$ increases from 80.6 mhos to (80.6)(27.5)=2217 mhos. Therefore $j\omega L_m=-j/(\omega C_m)$ and the magnetic circuit resonates.

To obtain the desired 27.5 factor, concentrator gaps 30 must be approximately 0.0004 meters. As metal sample 31 melts and flows out of the levitation crucible, resonance is maintained by varying the frequency, $\omega$.

The advantages of the present invention are obvious in light of a conventional melt levitation system. To melt a copper sphere with a radius of 0.01 meters at 100 kHz, a conventional system uses approximately 800 A. Assuming a four turn configuration, the approximate levitating field is 160,000 A/m. The magnetic pressure that such a field can exert is $(\mu_0/2)H^2 \cong 1.6\times 10^4$ N/m$^2$. A metal sphere of radius 0.01 meters has a cross-sectional area of $\pi(0.01)^2=3.14\times 10^{-4}$ m$^2$. After the eddy currents are set-up, the effective area influenced by the magnetic field which sees the full pressure is on the order of a tenth of this area, or $3.14\times 10^{-5}$ m$^2$. The levitating force is therefore $(1.6\times 10^4)(3.14\times 10^{-5})=0.5$ N. This force is sufficient to levitate 0.05 kg of metal, which is approximately the weight of a copper sphere of radius 0.01 meters.

Assuming a 10 mm diameter wire with a skin depth of 0.21 mm and a conductivity of $6\times 10^7$ moh/m, the power wasted on the metal coils carrying the 800 A is approximately 350 watts ($R_w[800]^2=[5.5\times 10^{-4}]800^2=350$). Note that the power dissipated in the metal to be melted is on the order of tens of kilowatts.

In contrast, by using the above described embodiment of the invention with its multiplication factor of approximately 13, only 61.5 A are required to achieve the same melt levitation field with the same four turn configuration (800/13=61.5). In this case the power dissipated by the metal coils is only 2 watts ($[5.5\times 10^{-4}][61.5]^2=2$) thus leading to much cooler exciting coils. Instead of dissipating the wasted power in the exciting coil, the melt levitation system using the present invention dissipates the power in the ferrite magnetic winding. In this embodiment:

$R_m$=169 mhos $I_m$=mmf/$R_m$=4(61.5)/169=1.46 volts

The wasted power is then $I_m^2 R_m=(1.46)^2(169)=360$ watts. Therefore approximately the same amount of power is wasted (within the tolerance of the calculations) however in the magnetic resonant circuit there is very little heating of the exciting coil. Instead the ceramic ferrite absorbs the heat.

2. Resonant Magnetic Transformer for Levitation Melt Applications

This embodiment utilizes the basic design illustrated in FIG. 4 and uses the same materials as described in the previous example. Primary winding 15 on which current source 1 is wound is comprised of 47 turns for a total length of 128 meters. Secondary winding 17 is comprised of 112 turns for a total length of 291 meters. The characteristics of the primary are:

$R_m$=51.6 mhos $\omega L_m$=193.7 mhos $Q_m$=3.75

The characteristics of the secondary are:

$R_m$=117.3 mhos $\omega L_m$=1100 mhos $Q_m$=9.38

The turns ratio is 112/47=2.38.

The secondary feeds the same air gap as in the previous levitation melt system except in the present embodiment $\omega L_m$ equals 1100 instead of 2217. Therefore the $C_m$ only has to be increased by 13.6 instead of 27.5. This allows the gap in the flux concentrator to be larger, approximately 0.0008 meters. This configuration yields the $1/(\omega C_m)$ required to achieve resonance and a multiplication factor $Q_m$ of 9.38.

Figure 15:
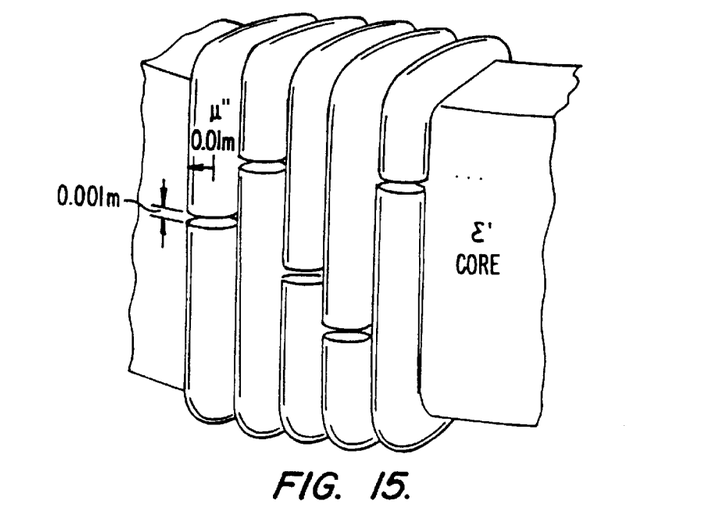
FIG. 15 is an illustration of the gaps in the primary winding of the magnetic step-up transformer shown in FIG. 4 when it is operated as a resonant transformer.

In this configuration the primary must also have a $C_m$ low enough to resonate. This can be accomplished by segmenting the winding on every turn with a gap of 0.001 meters as shown in FIG. 15. In this configuration the total series magnetic capacitance is $[\mu_0\pi(.01)^2]/[47(0.001)]$, giving a capacitive reactance of 189 ohms. This is on the order of $\omega L_m$, thus achieving resonance.

In order to show the performance improvement offered by this embodiment of the invention, assume that the desired magnetic field in the air gap is the same as in the previously described embodiment. Since the concentrator factor is smaller in this case, $I_m$ in the secondary must be larger than in the first device. Therefore:

$I_{m(secondary)}$=1.46(25.7/13.6)=2.75 volts mmf$_{secondary}$=2.75 volts×117.3 mhos=322.6 amp-turns mmf$_{primary}$=mmf$_{secondary}$/turns ratio=135.5 amp-turns Since the primary has a $Q_m$ of 3.75:

mmf$_{source}$=36 amp-turns

Therefore, for 4 turns the total source current is 9 amps.

This is much less than the 800 amps required by the conventional melt levitation system. In order to achieve this low power dissipation in the windings, the ferrite must issipate a greater amount of power. For this embodiment:

Secondary dissipates $(2.75)^2(117)$=884 watts

Primary dissipates $(135.5)^2/51.6$=355 watts

Winding dissipates $(9)^2(5.5\times 10^{-4})$=0.04 watts.

3. Step-Up Transformer for Matching Transmission Line to a Source at 25 MHz

Figure 16:
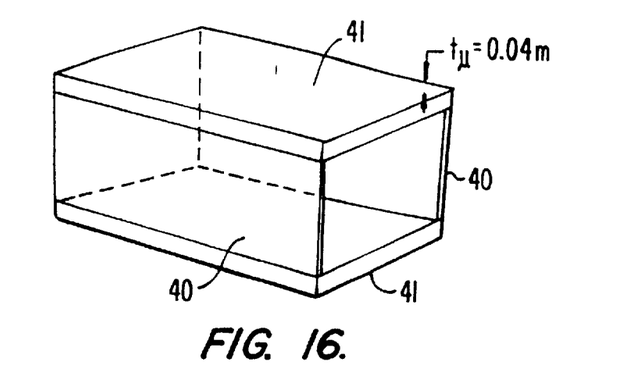
FIG. 16 is an illustration of a magnetic transmission line.
Figure 17:
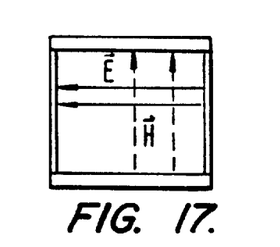
FIG. 17 is an illustration of the fundamental mode field of the structure shown in FIG. 16.

FIG. 16 is an illustration of a magnetic transmission line. Sides 40 are copper plates approximately 1 millimeter thick. Sides 41 are high loss ferrites in which $t_\mu$ is 0.04 meters and $\mu''$ is approximately 5000. The cross-sectional dimensions are 0.3 meters by 0.3 meters. FIG. 17 illustrates the fundamental mode field of this structure. The structure has a wave impedance of 377 ohms and a transmission line magnetic impedance, $\zeta$, of 1/377 or 0.0026 mhos.

Assuming that we wish to feed this transmission line with a 50 ohm voltage source, equation 15 gives an impedance seen at the source of:

$$V_{source}/I_{source} = R_{wire} + [(N_1^2)/(R_m + \zeta_m)]$$

Figure 18:
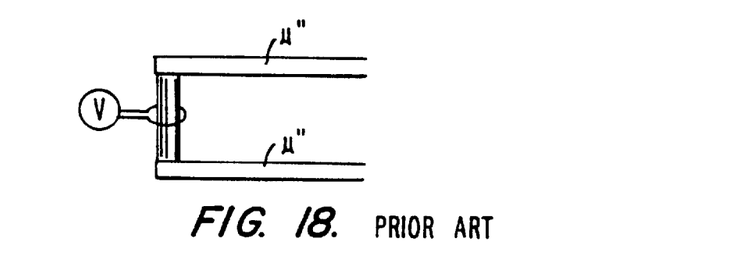
FIG. 18 is an illustration of a feeding arrangement for the transmission line of FIG. 16.

Therefore for the feeding arrangement shown in FIG. 18 and assuming $R_m \approx 0$, $R_{wire} \approx 0$ and there is only one turn, then there is a mismatch since the source sees 377 ohms instead of 50 ohms. To correct this mismatch we note that in the step-up transformer of FIG. 4:

$mmf_2 = (n_2/n_1)mmf_1$ $I_{m2} = (n_1/n_2)I_{m1}$ and therefore $$\zeta_{m2} = mmf_2/I_{m2} = (n_2/n_1)^2 (mmf_1/I_{m1}) = (n_2/n_1)^2 \zeta_{m1}$$

The magnetic step-up transformer transforms magnetic impedance through the turns ratio. To obtain a match to the 50 ohm voltage source we need to step-up the transmission line impedance from 0.0026 mhos to 0.02 mhos or by a turns ratio of $(0.02/0.0026)^{1/2} = 2.8 \approx 3$. Therefore a step-up transformer with a turns ratio of 3 as shown in FIG. 19 will match the source with the transmission line.

Figure 19:
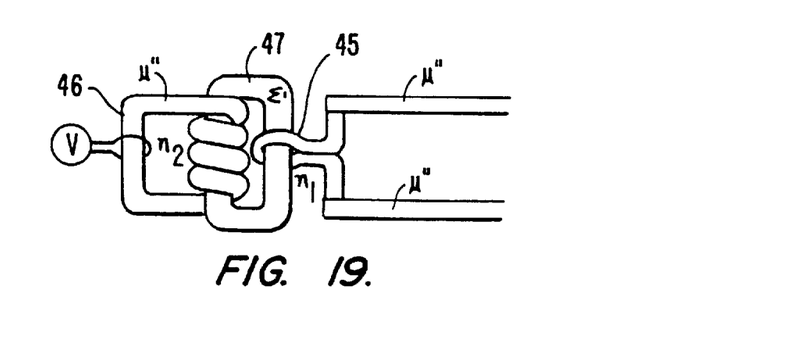
FIG. 19 is an illustration of a step-up transformer with a turns ratio of three.

In the step-up transformer of FIG. 19, a first winding 45 is made of a material with $\mu'' \approx 3000$ at 25 MHz, a radius of 0.005 meters and a total length of 0.6 meters. A second winding 46 is made of the same material as the first winding and due to its three turns has a total length of 1.2 meters. Dielectric core 47 has a radius, $r_1$, of 0.048 meters, a total length, $l_m$, of 0.444 meters and a $\epsilon'$ of $5000\epsilon_0$.

From equation 11 we get: $L_m = (\epsilon_r' \epsilon_0 n^2 \pi r_1^2)/l_m$ Therefore:

$L_{m(1\ turn)} = [(5000)(8.854 \times 10^{-12})(\pi)(0.048)^2]/0.444 = 7.2 \times 10^{-10}$ $L_{m(3\ turns)} = 6.49 \times 10^{-9}$ and $\omega L_{m(1\ turn)} = 0.113$ mhos $\omega L_{m(3\ turns)} = 1.02$ ohms The magnetic resistance is:

$R_{m(1\ turn)} = 0.6/[\omega \mu''(0.005)^2] = 0.6/[(2\pi)(25)(10^6)(3000)(4\pi)(10^{-7})(.005)^2] = 0.04$ mho $R_{m(3\ turns)} = 0.08$ mho Since $\omega L_m$ is greater than $R_m$ in each case, the circuits are inductance limited and the step-up transformation occurs.

Thus a transmission line of magnetic impedance 0.0026 mho is transformed by the ratio $\omega L_{m(3\ turns)}/\omega L_{m(1\ turn)} = 9$ to 0.0234 mhos and a one turn loop connected to a 50 ohm source will read an impedance of $1/0.0234 = 43$ ohms, effectively matched to 50 ohms.

Therefore what started out as a mismatch of 7.5:1 (i.e., 377/50) has become 1.16:1 (i.e., 50/43) match using this embodiment of the invention. A closer match can be achieved by careful adjustment of the parameters.

4. Quarter Wave Resonator for Seawater Pumping and Propulsion at 25 MHz

Figure 20:
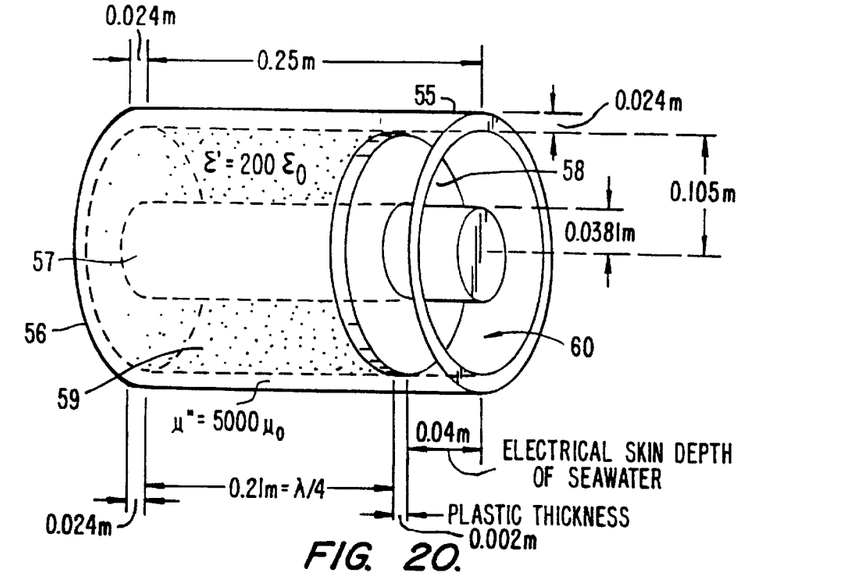
FIG. 20 is an illustration of a quarter wave resonator for seawater pumping and propulsion.

FIG. 20 is an illustration of a quarter wave resonant amplifier. This embodiment consists of a magnetic coaxial transmission line 0.25 meters long in which the outer cylinder 55 has a wall thickness of 0.024 meters. Outer cylinder 55 has a shorted end 56. Cylinder 55 and end 56 are both made of a lossy permeable material with $\mu''$ equal to $5000\mu_0$. The inner radius, b, of cylinder 55 is 0.105 meters.

The inner coax cylinder 57 has an outer radius, a, of 0.0381 meters. Plastic barrier 58 seals the open end of the transmission line and is approximately 0.002 meters thick and mounted 0.21 meters (i.e., $\lambda/4$) from shorted end 56. Volume 59 is filled with a dielectric and volume 60 is filled with seawater. In this embodiment the dielectric is a ceramic filled foam, such as barium strontium titanate which has an $\epsilon'$ of 2800, at 7% density. Volume 60 can also be filled with alternating ceramic disks and foam spacers. For example, 20 ceramic disks each with a thickness of 0.000744 meters separated by 20 foam spacers of 0.0097 meters thickness can be used.

Figure 21:
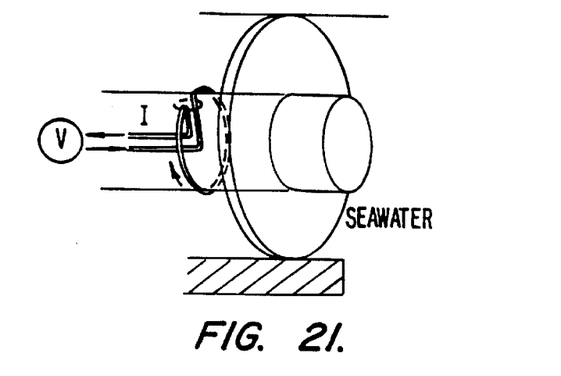
FIG. 21 is an illustration of a feed mechanism for the resonator shown in FIG. 20.

In order to set-up a standing wave inside the resonator, a small mmf is introduced into the structure, for example using a one turn coil near the seawater end as shown in FIG. 21. In this case the input $mmf_1$ is equal to I and the amplified $mmf_2$ is equal to 120.8 I (the amplification factor, $Q_m$, of 120.8 was previously derived in Section II[5]). Therefore at the open end:

$$H(r) = (120.8I)/r$$

with a pressure distribution equal to:

$$(\mu_0/2)H^2 = (\mu_0/2)(120.8)^2(I^2/r^2)$$

Thus the force at the mouth of the waveguide is:

$$(\mu_0/2)(120.8)^2 I^2 \int (1/r^2) 2\pi r\ dr = \mu_0 (120.8)^2 \pi I^2 \ln(b/a)$$

so force $\approx 0.0576\ I^2$ Newtons

The area of the mouth of the waveguide is:

$$\pi(0.105^2 - 0.0381^2) = 0.03\ m^2$$

Therefore the mean pressure drop is:

$$(0.0576/0.03)I^2 = 1.92\ I^2\ \text{Pascals}$$

This pressure drop occurs over the depth of fluid required for the B field to go to zero due to the eddies. This distance is on the order of three skin depths, or 0.12 meters. Therefore the resonator can produce a pressure drop of 1.92 $I^2$ Pascals over 0.12 meters of fluid which is equivalent to $16I^2$ Pa/m.

Figure 22:
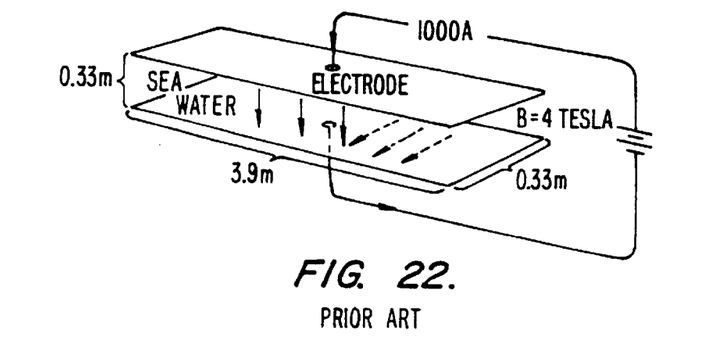
FIG. 22 is an illustration of a conventional electromagnetic thruster.

The design of a conventional electromagnetic thruster is shown in FIG. 22. The dimensions of the thruster channel are 0.33 meters by 0.33 meters by 3.9 meters. The thruster uses 1000 A to produce 1333 N. The pressure drop is therefore $1333/0.33^2$ which equals $1.22 \times 10^4$ Pascals. Over a 3.9 meters length this is equivalent to $3.14 \times 10^3$ Pa/m. A length of 0.12 meters of electrode carries a current of 1000(0.12/3.9), or 30.77 A. Applying this current in the embodiment of the invention described above would yield $16(30.77)^2$ Pa/m, or $15.1 \times 10^3$ Pa/m. Thus the embodiment of the invention described above is approximately 5 times more efficient that the conventional thruster. Furthermore, the invention does not require a superconducting magnet to supply the B field.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

I claim:

1. A pump, comprising:

a magnetic coaxial transmission line comprising and outer cylinder made of a first lossy permeable material and an inner cylinder made of a second lossy permeable mateial, said coaxial transmission line having a first end and a second end;

an end plate sealably coupled to said first end, said end plate made of a third lossy permeable material, wherein said end plate shorts said coaxial transmission line;

a barrier sealably coupled to an inner wall of said outer cylinder and sealably coupled to an outer wall of said inner cylinder, said barrier located approximately a quarter wave away from said first end plate, and wherein said barrer is substantially transparent to electromagnetic waves within said resonant amplifier;

a dielectric filler located between said outer and inner cylinders and between said end plate and said barier;

a conducting pump fluid located between said outer and inner cylinders and between said barrier and said second end;

at least one conducting pump fluid intake port in said outer cylinder, said at least one conducting pump fluid intake port located between said barrier and said second end; and an input magnetomotive force source connected to said quarter wave resonant amplifier.

2. The pump of claim 1, wherein said first, second, and third lossy permeable materials are of substantially equivalent compositions.

3. The pump of claim 1, wherein the lossy permeable materials are induced to have high loss by artificial means.

4. The pump of claim 1, wherein said conducting pump fluid is seawater.

5. The pump of claim 1, wherein said dielectric filler is comprised of a plurality of ceramic disks interspersed with a plurality of foam spacers.

6. The pump of claim 1, wherein said dielectric filler is a ceramic filled foam.

7. The pump of claim 1, wherein said input source is a one turn coil wound around said inner cylinder.

8. The pump of claim 7, further comprising an AC voltage source connected to said one turn coil.

9. The pump of claim 1, wherein the input source is a rod made of a lossy permeable material inserted into said dielectric filler through a hole in said inner coax cylinder.

10. The pump of claim 9, further comprising an AC voltage source connected to a solenoid wrapped around said lossy permeable rod.

11. The pump of claim 1, wherein said barrier is made of plastic.

12. A method of pumping a conducting fluid, comprising the steps of:

coaxially locating a first lossy permeable cylinder within a second lossy permeable cylinder;

sealably coupling a permeable shorting end plate to a first end of said first and second cylinders;

sealably coupling a barrier plate to an inner wall of said second cylinder and an outer wall of said first cylinder, said barrier plate located approximately a quarter wave away from said shorting end plate, and wherein at least conducting fluid intake port is located within said outer cylinder and between said barrier plate and a second end of said outer and inner cylinders;

locating a dielectric filler between said first and second cylinders and between said barrier plate and said shorting end plate;

locating said conducting fluid between said first and second cylinders and between said barrier plate and said second end of said outer and inner cylinders; and applying a magnetomotive force to said first cylinder.

\* \* \* \* \*